United States Patent
Hsu

(10) Patent No.: US 7,337,341 B2
(45) Date of Patent: *Feb. 26, 2008

(54) COMPUTER SYSTEM AND POWER MANAGEMENT METHOD THEREOF WHEREIN CENTRAL PROCESSING UNIT DOES NOT SUPPORT THE HYPER TRANSPORT TECHNOLOGY

(75) Inventor: Ming-Wei Hsu, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/561,924

(22) Filed: Nov. 21, 2006

(65) Prior Publication Data
US 2007/0118777 A1    May 24, 2007

(30) Foreign Application Priority Data
Nov. 24, 2005  (TW)  .............................. 94141347 A

(51) Int. Cl.
G06F 1/00    (2006.01)
G06F 13/20   (2006.01)
H02J 3/12    (2006.01)

(52) U.S. Cl. .................. 713/323; 323/234; 710/313

(58) Field of Classification Search ................ 713/323, 713/300, 320; 710/313; 345/520; 323/234
See application file for complete search history.

(56) References Cited

U.S. PATENT DOCUMENTS

| 6,040,845 | A  | * | 3/2000 | Melo et al. ................. 345/520 |
| 6,241,400 | B1 | * | 6/2001 | Melo et al. ................. 710/313 |
| 7,007,175 | B2 | * | 2/2006 | Chang et al. ............... 713/300 |
| 2005/0093524 | A1 | * | 5/2005 | Hsu ........................... 323/234 |

* cited by examiner

*Primary Examiner*—Suresh K Suryawanshi
(74) *Attorney, Agent, or Firm*—Thomas, Kayden, Horstemeyer & Risley

(57) ABSTRACT

A computer system and a power management method thereof are provided. The computer system includes a system management controller, a northbridge, a hyper transport bus, a central processing unit and a power management signal line. The northbridge is electrically connected to the system management controller via the hyper transport bus. The central processing unit is electrically connected to the northbridge but does not support the hyper transport bus. The system management controller outputs a power management signal to the central processing unit and the northbridge via the power management signal line. When the system management controller asserts the power management signal, data transmission is stopped with the disconnection of the hyper transport bus, and the central processing unit changes to a power-saving state from a working state.

20 Claims, 2 Drawing Sheets

COMPUTER SYSTEM AND POWER MANAGEMENT METHOD THEREOF WHEREIN CENTRAL PROCESSING UNIT DOES NOT SUPPORT THE HYPER TRANSPORT TECHNOLOGY

This application claims the benefit of Taiwan application Ser. No. 94141347, filed Nov. 24, 2005, the subject matter of which is incorporated herein by reference.

BACKGROUND OF THE INVENTION

1. Field of the Invention

The invention relates in general to a computer system and a power management method thereof, and more particularly to a computer system whose central processing unit does not support hyper transport bus and a power management method thereof.

2. Description of the Related Art

Power management is a very important function in a computer system, and particularly in a notebook computer. Notebook computer is portable and greatly relies on the battery to provide the necessary electricity Therefore, the duration of stand-by time and the battery efficiency under limited power supply depend on the performance of power management in the computer system.

After the computer system is started up and is in an idle state, the power management function removes part of the power supplied by the computer system so as to reduce power consumption and achieve power saving. With the growth in environmental awareness, the power management system is now applied not only to the notebook computer but also to the desktop computer and different system platforms. Thus, how to enhance the function of power management has become a hot issue.

Currently, the computer system mainly adopts advanced configuration power interface (ACPI). Examples of the ACPI protocol include stand-by states S1~S5 and power-saving states C0, C1, C2 and C3 that support the central processing unit (CPU). The state C0 denotes that the CPU is in a working state; the state C1 denotes that the CPU is in a halt state; and the states C2 and C3 denote the stand-by state controlled by the operating system. Of the above power-saving states of the CPU, the numeric number implies the performance in power saving, that is, a larger number implies more power is saved, but the time delay for the CPU to restore the working state from the power-saving state is longer in the mean time.

However, if power management is applied to different devices in the computer system, the devices need to be connected to respective power management signal lines to receive the power management signal outputted from the computer system. Consequently, electro-magnetic interference will occur among the power management signal lines.

Similarly, since the devices need to be connected to respective power management signal lines, when the power management signal lines are disposed on the printed circuit board (PCB), the large number of signal lines will make the layout of the signal lines even complicated land difficult.

SUMMARY OF THE INVENTION

It is therefore an object of the invention to provide a computer system and power management method using hyper transport bus. In the computer system, the central processing unit, the northbridge and the system manager are electrically connected to the same power management signal line, such that when the system manager changes the central processing unit to a power-saving mode, power management is also applied to the hyper transport bus to save power consumption.

The invention achieves the above-identified object by providing a computer system. The computer system includes a system management controller, a northbridge, a hyper transport bus, a central processing unit and a power management signal line. The northbridge is electrically connected to the system management controller via the hyper transport bus. The central processing unit is electrically connected to the northbridge but does not support the hyper transport bus. The system management controller outputs a power management signal to the central processing unit and the northbridge via the power management signal line. After the power management signal is asserted, the data transmission is stopped with the disconnection of the hyper transport bus, and the central processing unit changes to a power-saving state from a working state.

The invention achieves another object by providing a power management method using hyper transport bus. The power management method using hyper transport bus is applied in a computer system. The computer system includes a system management controller, a northbridge, a hyper transport bus and a central processing unit. The central processing unit without supporting the hyper transport bus technology is electrically connected to the northbridge. The northbridge is electrically connected to the system management controller via the hyper transport bus.

The power management method using hyper transport bus includes the following steps. Firstly, a power management signal line is provided. Next, the system management controller enables a power management signal. Lastly, the power management signal is outputted to the central processing unit and the northbridge via the power management signal line, such that the data transmission is stopped with the disconnection of the hyper transport bus and the central processing unit changes to a power-saving state from a working state.

Other objects, features, and advantages of the invention will become apparent from the following detailed description of the preferred but non-limiting embodiments. The following description is made with reference to the accompanying drawings.

DETAILED DESCRIPTION OF THE INVENTION

In the embodiment disclosed below, the central processing unit is enabled, the northbridge and the system management controller are electrically connected via the power management signal line, such that when the central processing unit changes to a power-saving state C3 from a working state C0, the hyper transport bus disposed between the northbridge and the system management controller disconnects data transmission to reduce power consumption.

Figure 1:
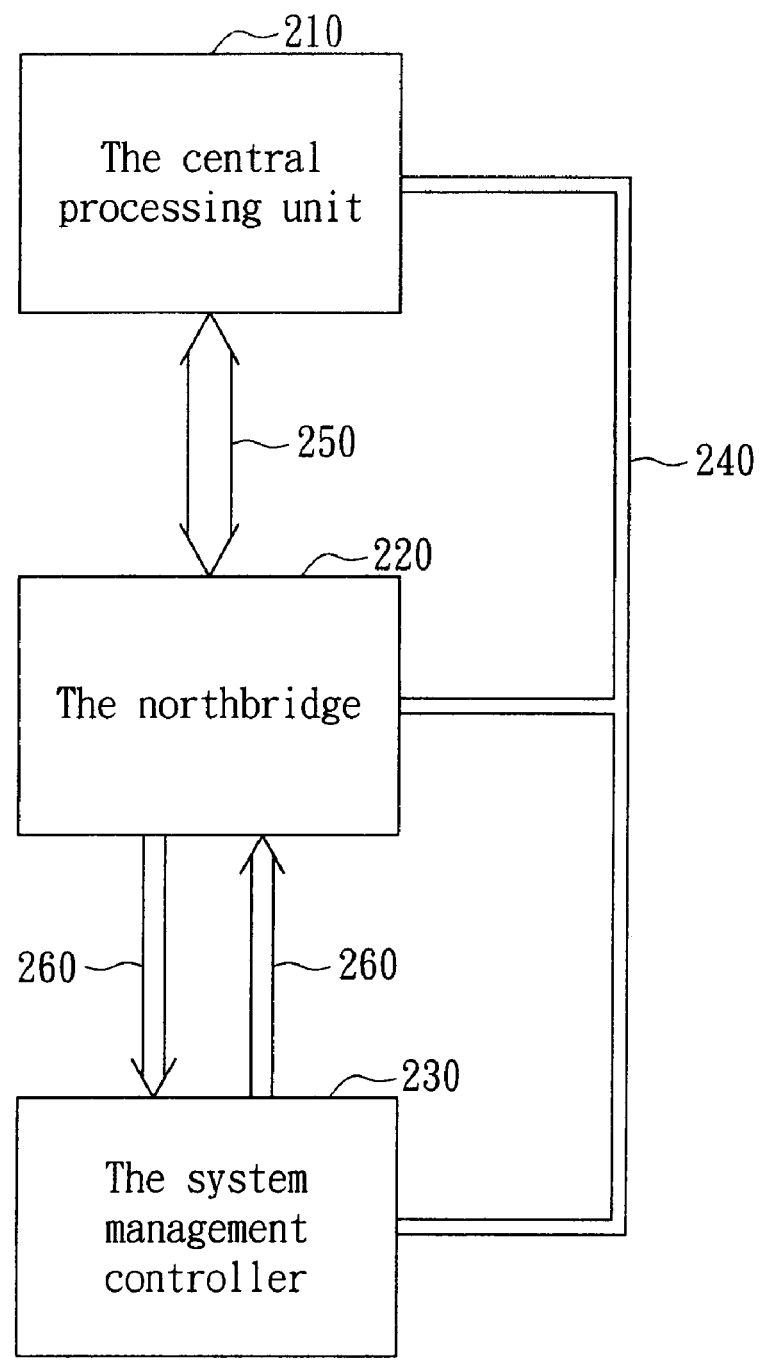
FIG. 1 is a block diagram of a computer system according to a preferred embodiment of the invention.

Referring to FIG. 1, a block diagram of a computer system according to a preferred embodiment of the invention is shown. The computer system 20 includes a central processing unit 210, a northbridge 220, a system management controller (SMC) 230, a power management signal line 240, a host bus 250 and a hyper transport bus 260. The central processing unit 210, such as an Intel P4 processor, an AMD K7 processor or a Celeron processor, is unable to support the hyper transport technology.

Since the Intel P4, the AMD K7 and the Celeron processor do not support the hyper transport technology, the host bus 250 of the present embodiment of the invention is a non-hyper transport bus.

In the computer system 20, the host bus 250 disposed between the central processing unit 210 and the northbridge 220 is a non-hyper transport bus, but the hyper transport bus 260 transmits data between the northbridge 220 and the system management controller 230. However, such configuration has never been used in prior arts.

In the present embodiment, the system management controller 230 is a southbridge. The central processing unit 210 and the northbridge 220 are electrically connected to the host bus 250 respectively for transferring data between the central processing unit 210 and the northbridge 220 via the host bus 250. The northbridge 220 and the system management controller 230 are respectively electrically connected to the hyper transport bus 260 for transferring data in a data-transferring state via the hyper transport bus 260. The power management signal line 240 such as signal line SLP# is electrically connected to the central processing unit 210, the northbridge 220 and the system management controller 230.

If the computer system 20 is in an idle state, the computer system 20 drives the system management controller 230 by an operating system. The system management controller 230 enables the power management signal by asserting the power management signal for example. The system management controller 230 outputs the power management signal to the central processing unit 210 and the northbridge 220. After the power management signal is asserted, the central processing unit 210 changes to a power-saving state C3 from a working state C0 to reduce power consumption.

Likewise, in order to reduce power consumption effectively, the system management controller 230 outputs the power management signal to the northbridge 220 via the power management signal line 240. After the power management signal is asserted, the computer system 20 disconnects the original data transmission of the hyper transport bus 260 to reduce power consumption.

The computer system 20 further includes a number of peripheral devices (not illustrated) such as mouse and keyboard. The peripheral devices are electrically connected to the system management controller 230. When the peripheral devices are activated, for example, the mouse is shifted or the keyboard is pressed, or the system management controller 230 de-asserts the power management signal. After the power management signal is de-asserted, the central processing unit 210 returns to the working state C0 from the power-saving state C3 and performs various functions.

Similarly, since the central processing unit 210 returns to the working state C0, the hyper transport bus 260 has to correspondingly restore the data transmission. The power management signal is outputted to the northbridge 220 via the power management signal line 240. After the power management signal is de-asserted, the computer system 20 restores the original data transmission of the hyper transport bus 260, such that data are transferred between the northbridge 220 and the system management controller 230 via the hyper transport bus 260 in a data-transferring state.

Figure 2:
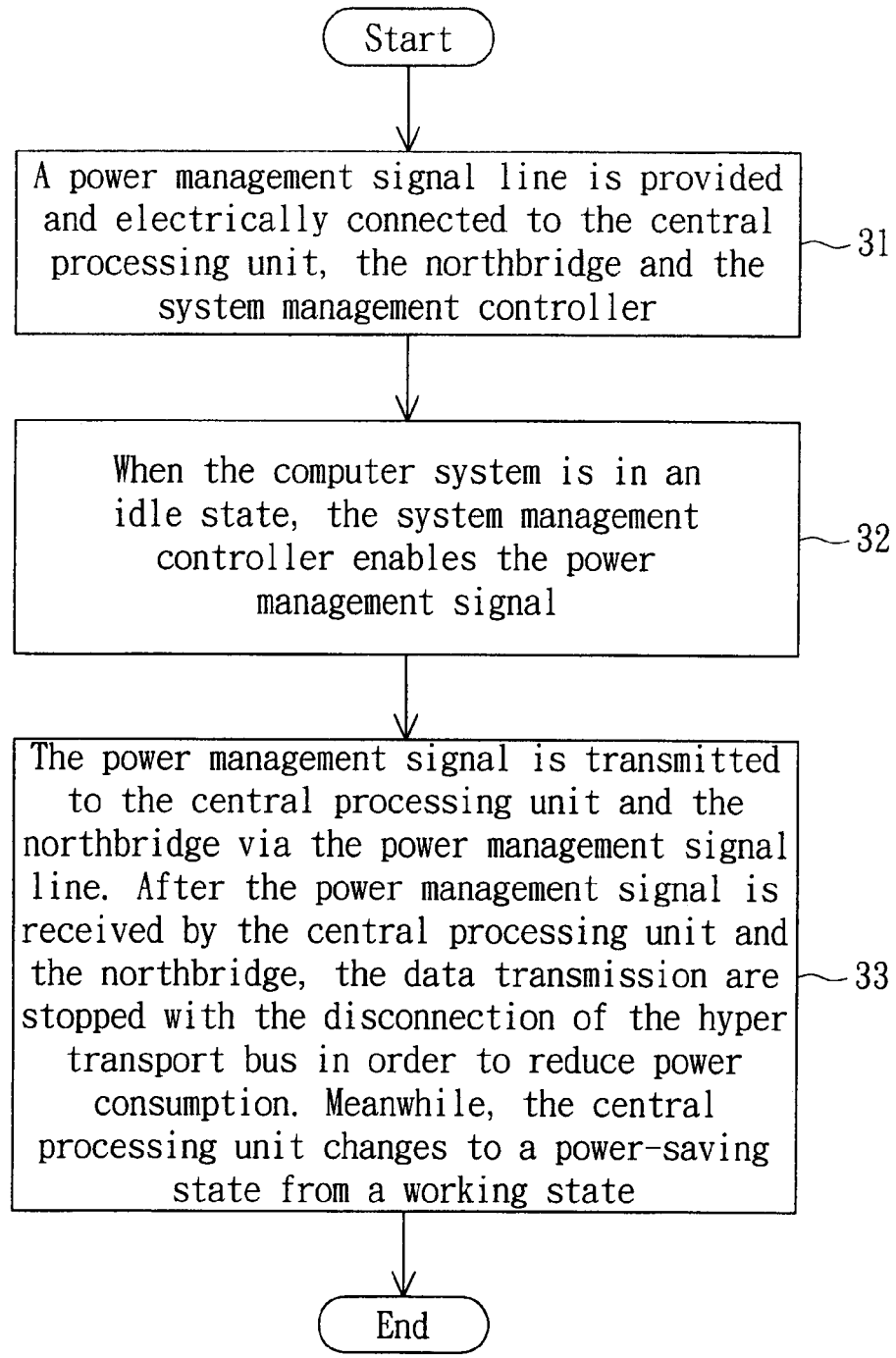
FIG. 2 is a flowchart of a power management method using hyper transport bus according to a preferred embodiment of the invention.

Referring to FIG. 2, a flowchart of a power management method using hyper transport bus according to a preferred embodiment of the invention is shown. The power management method using hyper transport bus includes the following steps. Firstly, as indicated in step 31, a power management signal line 240 such as signal line SLP# is provided and electrically connected to the central processing unit 210, the northbridge 220 and the system management controller 230.

Next, as indicated in step 32, when the computer system 20 is in an idle state, the system management controller 230 enables the power management signal. For example, the system management controller 230 asserts the power management signal.

Lastly, as indicated in step 33, the power management signal is transmitted to the central processing unit 210 and the northbridge 220 via the power management signal line 240. After the power management signal is received by the central processing unit 210 and the northbridge 220, the data transmission are stopped with the disconnection of the hyper transport bus 260 in order to reduce power consumption. Meanwhile, the central processing unit 210 changes to a power-saving state C3 from a working state C0.

In the computer system, the bus bandwidth between the northbridge and the southbridge is determined according to external peripheral devices such as keyboard, mouse, floppy disc, hard disc and printer. As high-speed I/O peripheral devices, such as Serial-ATA, universal serial bus (USB) and IEEE1394 firewire have gradually become standard equipment to a computer system, the original bus specification is unable to meet the needs. Therefore, the hyper transport bus protocol is used in transferring data between the northbridge and the southbridge, such that the data transfer rate between the northbridge and the southbridge is further increased.

The hyper transport bus protocol is provided by the AMD. According to the hyper transport bus protocol, the connection between integrated circuits (ICs) is high-speed and point-to-point, two one-way connections (transmission and reception) are used in connecting two chips, and daisy chain is used in connecting multiple elements, so there is no limit regarding how many function modules can be used.

The hyper transport bus provides high-speed and serial connection for the bandwidth of 4 bit, 8 bits, 16 bits and 32 bits. The hyper transport bus can change the synchronous clock rate of each lead, provide a bandwidth of 12.8 GB/sec, and selects the maximum transfer rate according to the needs and the processing ability of the computer system. Therefore, the good tradeoff between cost and speed can be achieved.

Moreover, the hyper transport bus is not merely limited to the data transmission between the southbridge and the northbridge. The hyper transport bus is also applicable to any two modules of a computer system. The hyper transport bus technology is developed to fit the needs of high-frequency bandwidth equipment such as memory controller, hard disc controller and PC bus controller. The hyper transport bus adjusts the working frequency and bit-width to fit the types of transfer equipment employed. The hyper transport bus can double the data transfer rate. Referring to table 1, data transfer rates of the hyper transport bus under the frequencies of 400 MHz and 800 Mhz are shown.

TABLE 1

| 400 MHz Hyper Transport Bus | |
|---|---|
| Two-Way 4 bit Mode | 0.8 GB/s |
| Two-Way 8 bit Mode | 1.6 GB/s |
| 800 MHz Hyper Transport Bus | |
| Two-Way 8 bit Mode | 3.2 GB/s |
| Two-Way 16 bit Mode | 6.4 GB/s |
| Two-Way 32 bit Mode | 12.8 GB/s |

When the hyper transport bus is able to transmit data, the computer system transfers data bidirectionally between the northbridge and the southbridge, hence consuming more power. To the contrary, when the hyper transport bus is disconnected and unable to transmit data, the computer system stops transferring data bidirectionally between the northbridge and the southbridge, hence reducing power consumption.

When the computer system is in an idle state, the central processing unit changes to the power-saving state C3 from the working state C0 so to reduce power consumption for the central processing unit. Therefore, the power management for the computer system will be more effective if the data transmission is stopped with the disconnection of the hyper transport bus. Meanwhile, the central processing unit changes to the power-saving state C3 and the power consumption is reduced.

A computer system and a power management method thereof are disclosed in the above embodiment of the invention. By enabling the power management signal line to be electrically connected to the northbridge and the central processing unit, the system management controller disconnects the hyper transport bus. At the same time, the central processing unit changes to a power-saving state and the power consumption is reduced.

Furthermore, the same power management signal line is electrically connected to both the northbridge and the central processing unit, hence avoiding the occurrence of electromagnetic interference between different power management signal lines.

Moreover, the northbridge and the central processing unit receive power management signal via the same power management signal line, therefore the difficulty in disposing the power management signal lien on the printed circuit board (PCB) will be reduced correspondingly.

Similarly, since the same power management signal line is electrically connected to both the northbridge and the central processing unit, the system management controller will use fewer leads, hence reducing the volume of the system management controller correspondingly.

While the invention has been described by way of example and in terms of a preferred embodiment, it is to be understood that the invention is not limited thereto. On the contrary, it is intended to cover various modifications and similarly arrangements and procedures, and the scope of the appended claims therefore should be accorded the broadest interpretation so as to encompass all such modifications and similar arrangements and procedures.

What is claimed is:

1. A computer system, comprising:
a system management controller (SMC); a northbridge;
a hyper transport bus, wherein the northbridge is electrically connected to the system management controller via the hyper transport bus;
a central processing unit (CPU), wherein the central processing unit without supporting the hyper transport technology is electrically connected to the northbridge; and
a power management signal line, wherein the system management controller outputs a power management signal to the central processing unit and the northbridge via the power management signal line, and after the the power management signal is asserted, data transmission is stopped with the disconnection of the hyper transport bus, and the central processing unit changes to a power-saving state from a working state.

2. The computer system according to claim 1, wherein the system management controller asserts the power management signal, such that the central processing unit changes to the power-saving state from the working state and that data transmission is stopped with the disconnection of the hyper transport bus.

3. The computer system according to claim 1, wherein when the system management controller de-asserts the power management signal, the hyper transport bus restores data transmission and the central processing unit returns to the working state from the power-saving state.

4. The computer system according to claim 3, further comprising a peripheral device electrically connected to the system management controller, wherein while the peripheral device is activated, the system management controller de-asserts the power management signal.

5. The computer system according to claim 1, wherein the power management signal line is a signal line SLP#.

6. The computer system according to claim 1, wherein the working state is a power state C0.

7. The computer system according to claim 1, wherein the power-saving state is a power state C3.

8. The computer system according to claim 1, further comprising an operating system driving the system management controller to generate the power management signal.

9. The computer system according to claim 1, wherein the central processing unit is an Intel Pentium processor.

10. The computer system according to claim 1, wherein the central processing unit is a K7 processor.

11. The computer system according to claim 1, wherein the central processing unit is a Celeron processor.

12. A power management method for reducing power consumption in a computer system, wherein the computer system comprises a system management controller, a northbridge, a hyper transport bus and a central processing unit, and the central processing unit without supporting hyper transport technology is electrically connected to the northbridge and the northbridge is electrically connected to the system management controller via the hyper transport bus, the power management method comprising:
providing a power management signal line;
enabling a power management signal by the system management controller; and
outputting the power management signal to the central processing unit and the northbridge via the power management signal line, such that data transmission is stopped with the disconnection of the hyper transport bus and that the central processing unit changes to a power-saving state from a working state.

13. The power management method according to claim 12, wherein in the enabling step, the system management controller asserts the power management signal, such that data transmission is stopped with the disconnection of the hyper transport bus and that the central processing unit changes to the saving power state from the working state.

14. The power management method according to claim 12, wherein when the system management controller de-asserts the power management signal, the hyper transport bus restores the data transmission and the central processing unit returns to the working state from the power-saving state.

15. The power management method according to claim 12, wherein the power management signal line is a signal line SLP#.

16. The power management method according to claim 12, wherein the working state is a power state C0.

17. The power management method according to claim 12, wherein the power-saving state is a power state C3.

18. The power management method according to claim 12, wherein the power-saving state is a power state C3.

19. The power management method according to claim 12, wherein the central processing unit is a K7 processor.

20. The power management method according to claim 12, wherein the central processing unit is a Celeron processor.

* * * * *